United States Patent
Huerta

Patent Number: 5,544,586
Date of Patent: Aug. 13, 1996

[54] SOLID FUEL RAMJET TUBULAR PROJECTILE

[75] Inventor: Joseph Huerta, Aberdeen, Md.

[73] Assignee: The United States of America as represented by the Secretary of the Army, Washington, D.C.

[21] Appl. No.: 300,004

[22] Filed: Aug. 30, 1994

[51] Int. Cl.$^6$ ....................................................... F02K 7/10
[52] U.S. Cl. ........................... 102/374; 102/503; 60/270.1
[58] Field of Search .................................. 60/270.1, 255; 102/374, 503, 291

[56] References Cited

U.S. PATENT DOCUMENTS

| | | | |
|---|---|---|---|
| H1007 | 1/1992 | Schadow et al. | 60/210 |
| 2,696,076 | 11/1949 | Weeks | 60/39.821 |
| 2,981,065 | 1/1951 | Sloan | 60/270.1 |
| 3,024,729 | 3/1962 | Kluge | 102/503 |
| 3,864,907 | 2/1975 | Curran | 60/261 |
| 4,368,620 | 1/1983 | Giles, Jr. | 60/270.1 |
| 4,502,649 | 3/1985 | Botwin et al. | 244/3.1 |
| 4,539,911 | 9/1985 | Flatau | 102/374 |
| 4,628,688 | 12/1986 | Keirsey | 60/251 |
| 5,214,914 | 6/1993 | Billig et al. | 60/204 |

FOREIGN PATENT DOCUMENTS

| | | | |
|---|---|---|---|
| 22742 | 12/1992 | WIPO . | |

Primary Examiner—Michael J. Carone
Assistant Examiner—Christopher K. Montgomery
Attorney, Agent, or Firm—Michael C. Sachs; Saul Elbaum; Edward L. Stolarun

[57] ABSTRACT

A solid fuel ramjet tubular projectile has a generally tubular body fabricated of dense material or suitable hardened material having a bore formed therethrough and having first and second ends. A plurality of partitions divide the bore into a plurality of separate combustion chambers. Each of the combustion chambers extends longitudinally substantially the length of the body. Solid fuel is formed upon the body within each of the combustion cheers. An inlet is formed at the first end of the body, into which air is received. The inlet is configured so as to substantially decelerate air entering the inlet at supersonic velocity to subsonic velocity prior to the air entering the combustion cheers. An outlet, through which combustion gases flow, is formed at the second end of the body. A mixing section is preferably formed intermediate the combustion chamber and the outlet so as to facilitate substantial mixing of the combustion gases from each combustion chamber prior to the combustion gases entering the outlet. A turbulence generator is optionally disposed proximate the first end of the body to enhance mixing of air and fuel. The turbulence generator is preferably configured as a plurality of radially extending spokes.

15 Claims, 2 Drawing Sheets

SOLID FUEL RAMJET TUBULAR PROJECTILE

This application is related to application Ser. No. 08/147,232, filed on Nov. 3, 1993 which is now abandoned.

FIELD OF THE INVENTION

The present invention relates generally to tubular projectiles and more particularly to a solid fuel ramjet tubular projectile comprising multiple longitudinal combustion chambers and an inlet turbulence generator.

BACKGROUND OF THE INVENTION

Projectiles having a tubular configuration for use in weaponry are known. Tubular configuration of such projectiles provides low drag by minimizing wind resistance. Such tubular projectiles may optionally utilize solid fuel ramjet thrust augmentation. Tubular projectiles utilizing solid fuel ramjet thrust augmentation are required to possess low drag while maintaining sufficient kinetic energy and mass to provide adequate terminal momentum and the consequent destructive force upon impact.

Such solid fuel ramjet tubular projectiles typically comprise a centralized tubular design with an internal midsection constituting a combustion chamber annularly lined with solid fuel for effecting thrust augmentation. The rear portion of such projectiles is provided with a thrust generating design comprising a constriction portion and a flared rear section, which operate on the hot expanding gases generated in the mid-section combustion chamber in a well-known manner.

Such solid fuel ramjet tubular projectiles are typically shot from a cannon, utilizing a sabot to prevent the exploding gases within the cannon's barrel from escaping through the bore of the solid fuel ramjet tubular projectile. The sabot then detaches from the solid fuel ramjet tubular projectile after the solid fuel ramjet tubular projectile exits the barrel, thus facilitating airflow through the bore thereof.

Explosive charges and/or hardened members may be incorporated into such solid fuel ramjet tubular projectiles to enhance the destructive power and/or penetrating ability thereof.

one such an arrangement which combines the design of a supersonic, low drag tubular projectile with an internally arranged, auto-ignited, solid fuel thrust augmentation system is disclosed in U.S. Pat. No. 5,067,406, issued on Nov. 26, 1991 to Olson et al., and entitled SUPERSONIC, LOW-DRAG, SOLID FUEL RAMJET TUBULAR PROJECTILE, the contents of which are hereby incorporated by reference.

It is well-known that, to effect auto-ignition and a sustained burn, the air flow through the combustion chamber should be subsonic. Moreover, to provide an even burn of the solid fuel, and thereby optimize burn efficiency and projectile stability, the combustion chamber should be relatively narrow in cross-sectional area.

Such solid fuel ramjet tubular projectiles may be either fin or spin stabilized, although spin stabilized solid fuel ramjet tubular projectiles have provided increased accuracy, i.e., an improved ability to strike a target.

Spin stabilization appears to produce poor combustion, resulting in lower than predicted thrust levels. Repeated range tests with the spinning ramjet projectiles have indicated much lower thrust performance than the calculated predictions indicated. This is thought to be due to an internal rotational flow of the air allowing only the outer layer of air to mix with the fuel. This condition would create a fuel rich combustion process through the fully open passageway of the body of the ramjet as the solid fuel ramjet tubular projectile spins in flight resulting in poor combustion efficiency and thus lower thrust levels than desired.

As such, although the prior art has recognized the desirability of providing a solid fuel ramjet tubular projectile, the proposed solutions have, to date, been ineffective in providing a satisfactory remedy.

SUMMARY OF THE INVENTION

The present invention specifically addresses and alleviates the above-mentioned deficiencies associated in the prior art. More particularly, the present invention comprises a solid fuel ramjet tubular projectile having a generally tubular body, the body having a bore formed therethrough, and also having first and second ends. A plurality of partitions divide the bore into a plurality of separate combustion chambers. Each of the combustion chambers extends longitudinally substantially the length of the body. Solid fuel is formed upon the body within each of the combustion chambers.

An inlet is formed at the first end of the body, into which air is received. The inlet is configured so as to substantially decelerate air entering the inlet at supersonic velocity to subsonic velocity prior to the air entering the combustion chambers.

An outlet, through which combustion gases flow, is formed at the second end of the body. The outlet comprises an exhaust nozzle which accelerates the combustion gases so as to enhance thrust in a well-known manner.

A mixing section is optionally formed intermediate the combustion chamber and the outlet so as to facilitate substantial mixing of the combustion gases from each combustion chamber prior to the combustion gases entering the outlet. Such mixing of the combustion gases produces a smooth transition into the exhaust nozzle of the outlet, thus facilitating an orderly expansion of the exhaust gases through the nozzle so as to further enhance thrust.

Spin stabilization optionally effects rotation of the solid fuel ramjet tubular projectile so as to increase the accuracy with which it may be fired at a target. Alternatively, fins may be utilized to effect stabilization of the solid fuel ramjet tubular projectile.

A turbulence generator is optionally disposed proximate the first end of the body to enhance mixing of air and fuel. The turbulence generator is preferably configured as a plurality of radially extending spokes. The radially extending spokes are preferably configured to have a generally wedge-shaped cross-section and may optionally be configured to have a generally circular or other desired cross-section. Those skilled in the art will recognize that various cross-sectional configurations are suitable.

The use of such a plurality of combustion chambers enhances mixing of incoming air with vaporized fuel to increase the thrust of the solid fuel ramjet tubular projectile of the present invention. The use of multiple combustion chambers reduces the internal volume of each combustion chamber and thus consequently reduces the outward distance required to diffuse the vaporized fuel. Thus, the multiple combustion chamber configuration of the present invention promotes more effective mixing of fuel with the incoming air than occurs in the larger combustion chambers of single combustion chamber solid fuel ramjets. This more effective mixing of the air and fuel results in a more efficient combustion process, thus creating a higher thrust level.

The use of multiple chambers in the solid fuel ramjet tubular projectile of the present invention mitigates the propensity for rotational flow of air and combustion gases to develop internally, particularly when spin stabilization is utilized. Thus the combustion process is enhanced, thereby increasing the thrust level.

Furthermore, the generation of turbulence at the inlet further enhances combustion efficiency by promoting more effective mixing of the incoming air and solid fuel vaporized by the heat of combustion.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
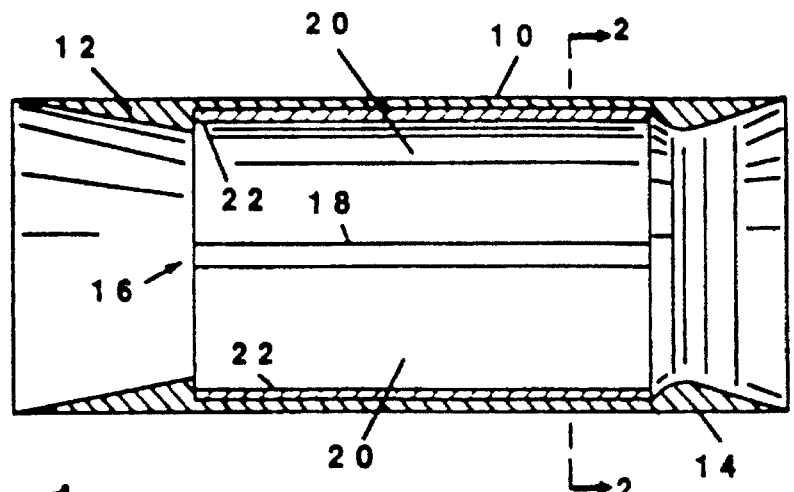
FIG. 1 is a cross-sectional side view of a first embodiment of the solid fuel ramjet tubular projectile of the present invention.
Figure 2:
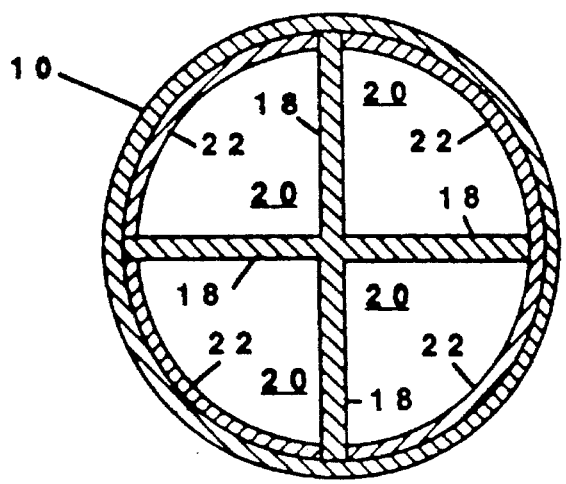
FIG. 2 is a cross-sectional end view taken along Line 2 of FIG. 1.
Figure 3:
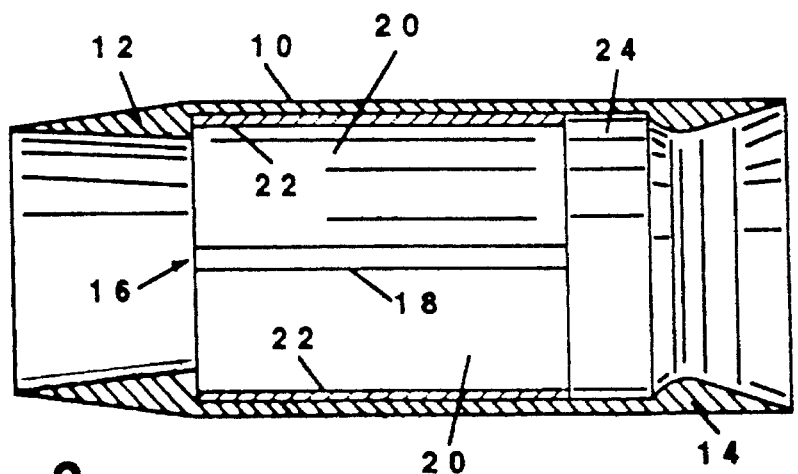
FIG. 3 is a cross-sectional side view of a second embodiment of the solid fuel ramjet tubular projectile of the present invention.
Figure 4:
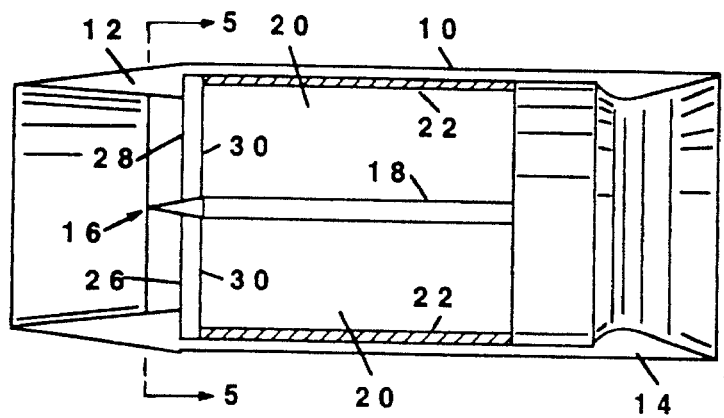
FIG. 4 is a cross-sectional side view of a third embodiment of the solid fuel ramjet tubular projectile of the present invention.
Figure 6:
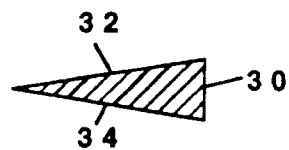
FIG. 6 is an enlarged cross-section of a wedge-shaped spoke taken along Line 6 of FIG. 5.
Figure 5:
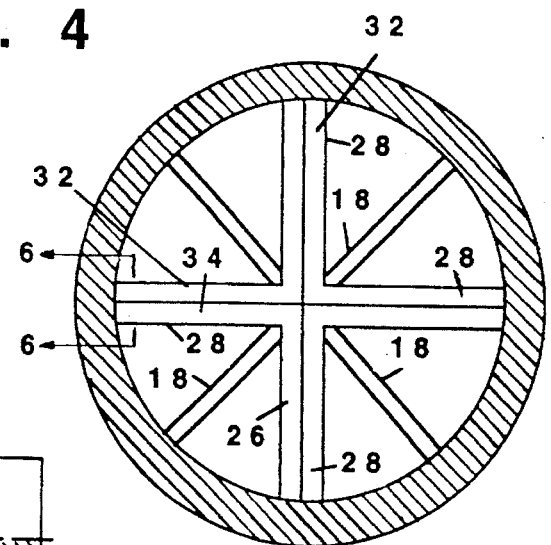
FIG. 5 is a cross-sectional end view taken along Line 5 of the FIG. 4.

The solid fuel ramjet tubular projectile of the present invention is illustrated in FIGS. 1–6 which depict three presently preferred embodiments of the invention. The first embodiment of the present invention comprises a solid fuel ramjet tubular projectile having multiple longitudinal combustion chambers and is illustrated in FIGS. 1 and 2 of the drawings. The second embodiment of the present invention comprises a solid fuel ramjet tubular projectile having multiple longitudinal combustion chambers according to the first embodiment thereof, and also having a mixing chamber formed intermediate the combustion chambers and the outlet, and is illustrated in FIG. 3 of the drawings. The third embodiment of the present invention comprises a solid fuel ramjet tubular projectile having a turbulence generator disposed at the inlet end thereof and is illustrated in FIGS. 4–6 of the drawings.

Although described herein and illustrated in the drawings as a tubular projectile, those skilled in the art will recognize that the solid fuel ramjet of the present invention may likewise be utilized in a wide variety of other applications. For example, the solid fuel ramjet of the present invention may be utilized to provide thrust augmentation to various vehicles powered by jet and/or rocket engines. Thus, use of the solid fuel ramjet of the present invention in a tubular projectile is by way of illustration only and not by way of limitation.

Referring now to FIGS. 1 and 2, the first embodiment of the solid fuel ramjet tubular projectile comprises a generally tubular body 10 having an inlet 12 formed at a first end thereof and a nozzle or outlet 14 formed at a second end thereof. A bore 16 is formed longitudinally through the body 10 such that air flows from the inlet 12 through the bore 16 of the body 10 and out through the outlet 14.

A plurality of partitions 18 separate the bore 16 of the body 10 into four separate combustion chambers 20. This configuration of the combustion chambers reduces the internal volume thereof, thereby consequently reducing the outward distance required to diffuse vaporized fuel. Thus, dividing the bore into a plurality of such reduced internal volume combustion chambers promotes improved mixing of the fuel with the incoming air as compared to larger, single combustion chamber ramjets.

Additionally, the resulting internal geometry prevents the internal rotational flow present in the fully open passageway of spin stabilized projectiles in flight. Elimination of the internal rotational flow increases the efficiency of the combustion process.

Although the present invention is described and illustrated as having four combustion chambers, such description and illustration is by way of example only, and not by way of limitation. Thus, those skilled in the art will recognize that various different numbers of combustion chambers, having various different configurations, are likewise suitable. Indeed, the plurality of separate combustion chambers need not be configured radially, in wedge-shaped segments, but rather may be of various different configurations, i.e., concentric rings, honeycomb, etc.

The combustion chambers 20 extend from approximately the inlet 12, to approximately the outlet 14, thus extending substantially the length of the body 10.

Solid fuel 22 is formed to the body 10 within each combustion chamber 20. The solid fuel 22 may be of any suitable composition such as rubber, plexiglass, or other composition which is preferably not ordinarily flammable at room temperature and atmospheric pressure.

Referring now to FIG. 3, a second embodiment of the solid fuel ramjet tubular projectile of the present invention is illustrated. In the second embodiment of the present invention a mixing section 24 is formed intermediate the combustion chambers 20 and the nozzle or outlet 14. The mixing section 24 provides for the substantial mixing of the combustion gases from the four separate combustion chambers 20 prior to the combustion gases passing through the outlet 14. Thus, the combustion gases essentially form a single large mass of moving gas, thus providing a smooth transition into the outlet 14 such that an orderly expansion of the gases through the outlet 14 is achieved.

Referring now to FIGS. 4–6, a third embodiment of the solid fuel ramjet tubular projectile of the present invention comprises a turbulence generator 26 disposed intermediate the inlet 12 and the combustion chambers 20. The turbulence generator 26 preferably comprises a plurality of radially extending spokes 28. Each radially extending spoke 28 is preferably wedge-shaped in cross-section (as best shown in FIG. 6). Alternatively, various other cross-sectional configurations, i.e., circular, oval, rectangular, octagonal, hexagonal, etc., of the spokes 28 are likewise suitable.

Those skilled in the art will recognize that various configurations (other than spoked) of the turbulence generator 26 are likewise suitable. For example, a series of concentric rings, a honeycomb configuration, etc. may be utilized in place of the radially extending spokes 28.

The use of such a turbulence generator 26 causes the incoming air to become sufficiently turbulent that the mixing process between the fuel and the incoming air is substantially enhanced. The use of wedge-like spokes results in turbulent air flow at the rear surface 30 thereof as the air separated by the two forward edges 32 and 34 of each wedge meet.

Although the mixing section 24 and the turbulence generator 26 are discussed in relation to different embodiments of the present invention, those skilled in the art will recognize that these features may be combined in a single embodiment thereof. Indeed, the turbulence generator may be utilized in conventional, single combustion chamber, solid fuel ramjet tubular projectiles.

Thus, it is understood that the exemplary solid fuel ramjet tubular projectiles described herein and shown in the drawings represent only presently preferred embodiments of the invention. Indeed, various modifications and additions may be made to such embodiments without departing from the spirit and scope of the invention. For example, the body 10 need not be generally tubular in configuration, but rather be of various other geometric configurations. Also, the combustion chambers 20 need not incorporate a portion of the body 10 as a wall or structural member thereof, but may be formed totally separate therefrom. The fuel 22 may optionally be formed upon the partitions 18 defining the multiple combustion chambers 20. Thus, these and other modifications and additions may be obvious to those skilled in the art and may be implemented to adapt the present invention for use in a variety of different applications.

To facilitate the launching of the solid fuel ramjet, it is necessary to attach a device at the base of the projectile to provide a seal to contain the propellent gases behind the projectile. For a sub-calibered projectile, a sabot design similar to that shown in FIG. 7 will be necessary to accomplish the task. Note that the sabot 2 slips over the projectile base. The sabot sleeve can be extended forward to any desired position as shown by the phantom lines labeled 3. The sabot can be fabricated from any material which can easily engage the rifling of the gun tube. Inserted between the sabot 2 and the base of the projectile is a steel disk 4 which provides a sturdy "pusher" mechanism to move the projectile up the launch tube.

Figure 7:
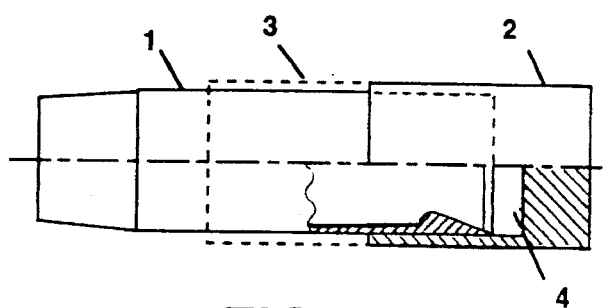
FIG. 7 is a partial cross-sectional view of the solid fuel ramjet tubular projectile of the present invention representing a sub-calibered configuration encased in a sabot.
Figure 8:
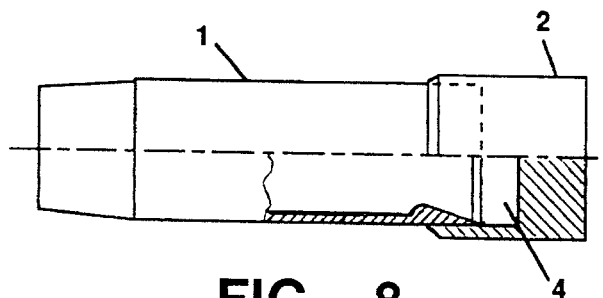
FIG. 8 is a partial cross-sectional view of the solid fuel ramjet tubular projectile of the present invention representing a full calibered configuration with obturator/rotating band attached.

For a standard solid fuel ramjet projectile, the design of FIG. 8 is more appropriate. Cap 2 is fitted over the base of the projectile. A steel pusher disk 4 similar to the aforementioned disk in FIG. 7 provides the same function as described above. This design will easily separate from the projectile base without causing any disturbance to the projectile's flight path. The design is fully described in U.S. SIR No. H960, the contents of which are hereby incorporated by reference.

What is claimed is:

1. A ramjet comprising:

a) a generally tubular body having a bore formed therethrough and having an inlet means at a first end of said bore for decelerating incoming air from supersonic velocity to subsonic velocity, and an exhaust nozzle means at a second end of said bore for expulsion of combustion gases;

b) a combustion chamber within said body defined by a portion of the bore formed therethrough and extending longitudinally substantially the length of said body between said inlet means and said exhaust nozzle means;

c) a partition in said combustion chamber which extends across and divides said combustion chamber into a plurality of individual combustion chambers;

d) wherein said partition is a longitudinally disposed planar structure having opposed edge surfaces joined to interior surfaces of the combustion chamber to divide the combustion chamber into a plurality of individual combustion chambers which each extend from said inlet means substantially the length of said body to thereby divide said decelerated incoming air into a plurality of discrete, substantially parallel combustion flow paths; and e) fuel disposed within said plurality of individual combustion chambers.

2. The ramjet as recited in claim 1 wherein said fuel is formed upon said body.

3. The ramjet as recited in claim 1 wherein said fuel comprises solid fuel.

4. The ramjet as recited in claim 1 wherein said body is spin stabilized in flight and wherein said plurality of combustion chambers mitigate internal rotational flow of air flowing through said body.

5. The ramjet as recited in claim 1 further comprising a turbulence generator disposed proximate the inlet means to enhance mixing of air and said fuel.

6. The ramjet as recited in claim 5 wherein said turbulence generator is configured as a plurality of radially extending spokes.

7. The ramjet as recited in claim 6 wherein said turbulence generator includes four radially extending spokes which intersect at a center point located on a center line of said combustion chamber, and each of said spokes extends across a respective individual combustion chamber.

8. The ramjet as recited in claim 7 wherein said spokes are configured to have generally wedge-shaped cross-sections.

9. The ramjet as recited in claim 7 wherein said spokes are configured to have generally circular cross-sections.

10. The ramjet as recited in claim 1 wherein said body defines a tubular projectile having longitudinal axial symmetry.

11. The ramjet as recited in claim 1 wherein said partition includes a plurality of transversely joined planar sections which subdivide the combustion chamber into four individual combustion chambers.

12. The ramjet as recited in claim 11 wherein said partition forms individual combustion chambers having a quarter-circle configuration to mitigate internal rotational flow of air therethrough and thereby enhance combustion.

13. The ramjet as recited in claim 1 wherein said combustion chamber has a generally cylindrical-shaped internal configuration and said partition results in a plurality of individual combustion chambers which each have a quarter-circle configuration transverse to their longitudinal axes to reduce rotational airflow therethrough and thereby enhance combustion.

14. The ramjet as recited in claim 1 and further including a mixing section formed intermediate said combustion chambers and said exhaust nozzle means for facilitating substantial mixing of the combustion gasses from each combustion chamber prior to the combustion gasses entering the exhaust nozzle means.

15. A solid fuel ramjet tubular projectile comprising:

a) a generally tubular body having a bore formed therethrough and having first and second ends;

b) a plurality of partitions dividing the bore into a plurality of separate combustion chambers, each of said combustion chambers extending longitudinally substantially the length of said body;

c) solid fuel formed within said combustion chambers;

d) an inlet formed at the first end of said body adjacent said plurality of partitions, into which air is received, said inlet being configured so as to substantially decelerate air entering said inlet at supersonic velocity to subsonic velocity prior to the air entering said combustion chambers;

e) an outlet formed at the second end of said body, through which combustion gases flow;

f) a mixing section formed intermediate said combustion chambers and said outlet so as to facilitate substantial mixing of the combustion gases from each combustion chamber prior to the combustion gases entering the outlet; and g) a turbulence generator disposed proximate the first end of said body to enhance mixing of air and said fuel.

* * * * *